United States Patent
Cadwell

[15] 3,673,833
[45] July 4, 1972

[54] SHOCK WAVE RIVETING MEANS AND METHOD

[72] Inventor: Gilbert C. Cadwell, Lakeside, Calif.
[73] Assignee: Rohr Corporation, Chula Vista, Calif.
[22] Filed: April 20, 1970
[21] Appl. No.: 30,002

[52] U.S. Cl..............................................72/56, 29/243.53
[51] Int. Cl.........................................................B23p 11/00
[58] Field of Search....................72/56, 430; 29/421, 243.53

[56] References Cited

UNITED STATES PATENTS

| | | | |
|---|---|---|---|
| 3,562,893 | 2/1971 | Winslow et al. | 29/243.53 |
| 3,420,079 | 1/1969 | Erlandson | 72/56 |
| 3,376,723 | 4/1968 | Chelminski | 72/56 |
| 2,995,053 | 8/1961 | Freedom | 72/430 |
| 3,267,710 | 8/1966 | Inoue | 72/56 |
| 3,267,780 | 8/1966 | Roth | 72/56 |
| 3,283,294 | 11/1966 | Schrom | 72/56 |

FOREIGN PATENTS OR APPLICATIONS

| | | | |
|---|---|---|---|
| 142,502 | 1961 | U.S.S.R. | 72/56 |

*Primary Examiner*—Richard J. Herbst
*Attorney*—George E. Pearson

[57] ABSTRACT

Method and means for upsetting a high strength rivet in a single operation which includes a housing having a cavity for receiving electrically conductive water. A transducer is mounted on the housing at one end of the cavity and has spaced electrodes defining a gap across which high voltage electrical energy is discharged to generate high velocity shock waves in the water. A piston in the housing at the other end of the cavity faces the transducer and moves in response to the application of shock wave forces transferred thereto through the water. A cavitated anvil is engaged with the upsettable end of a rivet and is moved by the piston to upset the rivet end by flowing it upon said application of shock wave forces to form a headed enlargement. The several parts of the device are proportioned in size, and weight and mass for dynamic balancing of forces and easy handling by a single worker. The electrical energy is delivered to the transducer by coupling means having high dielectric and strength properties for insuring the safety of the worker.

9 Claims, 10 Drawing Figures

3,673,833

PATENTED JUL 4 1972

INVENTOR.
GILBERT C. CADWELL
BY
George E. Pearson
ATTORNEY

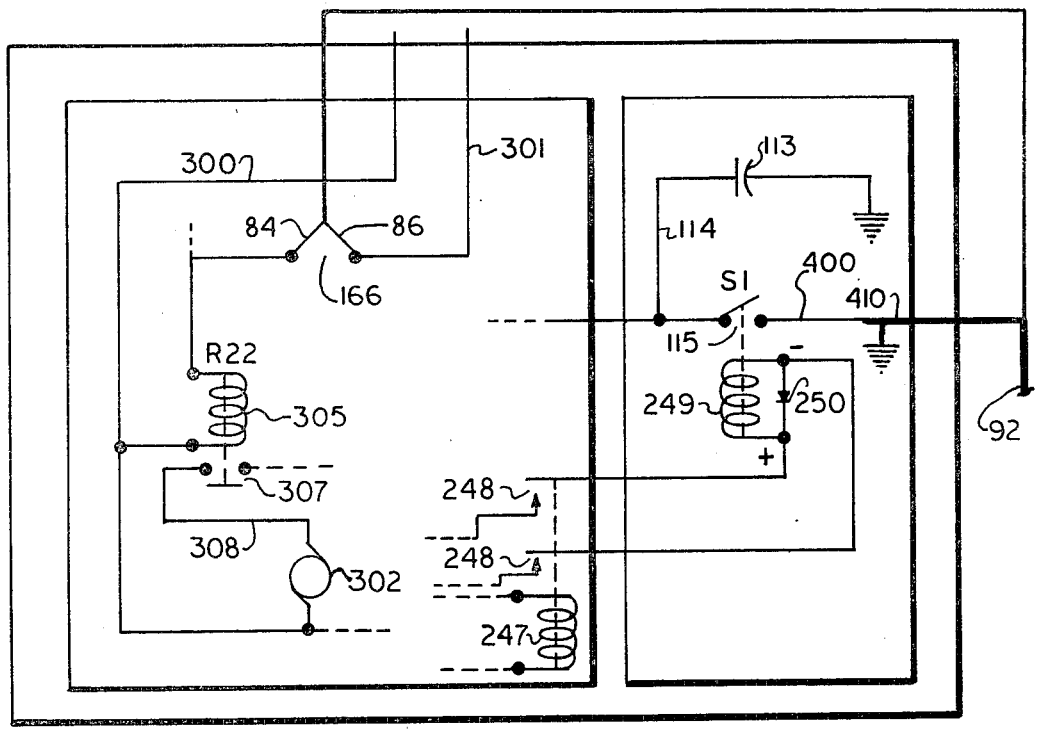
FIG. 6
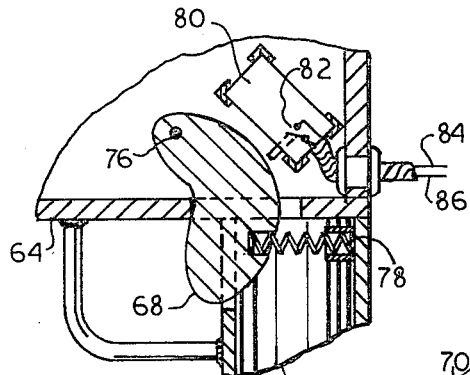
FIG. 4
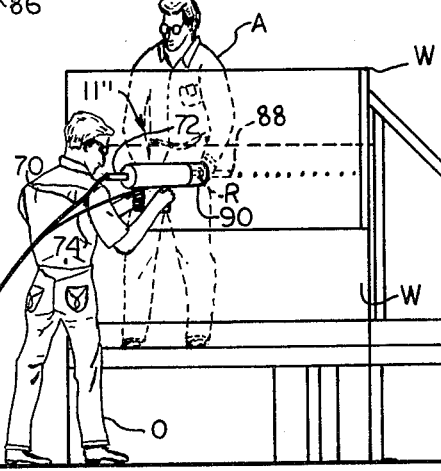
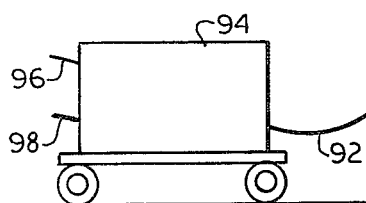
FIG. 5
INVENTOR.
GILBERT C. CADWELL
BY George E. Pearson
ATTORNEY

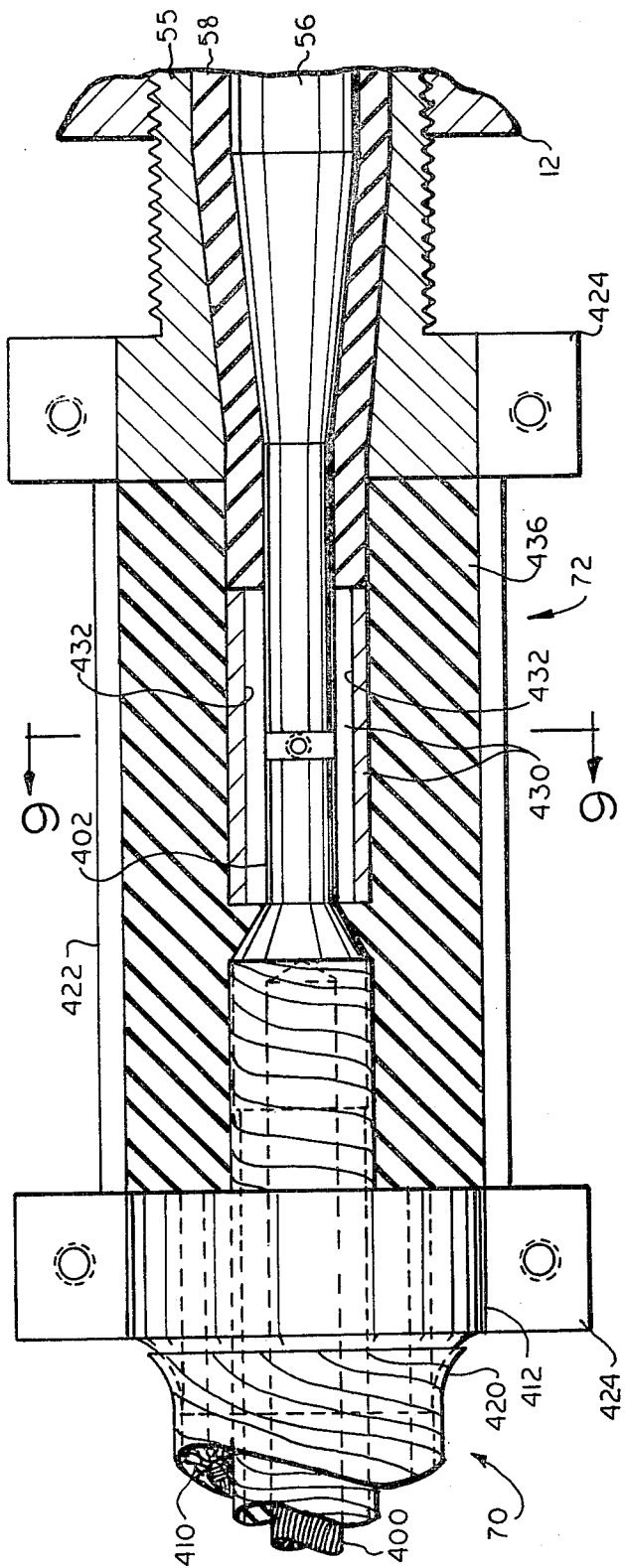
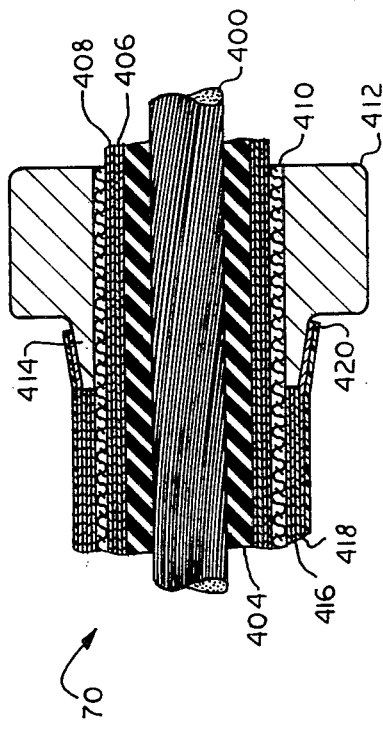

INVENTOR.
GILBERT C. CADWELL
BY
George E. Pearson
ATTORNEY

SHOCK WAVE RIVETING MEANS AND METHOD

CROSS REFERENCES TO RELATED PATENTS

This application is related to U.S. Pat. No. 3,364,708 issued Jan. 23, 1968, in the name of L. R. Padberg, Jr., and U.S. Pat. No. 3,452,565, issued July 1, 1969, in the name of G. C. Cadwell.

BACKGROUND OF THE INVENTION

The present invention relates generally to riveting devices and more particularly to a riveting device and method in which electrical energy at high voltage energy levels is discharged in a body of water to generate high velocity shock waves for providing forces necessary to upset a rivet, the body of water serving as the medium for transferring the forces of the shock waves to movable means which in turn transfer the forces to the upsettable end of a rivet for causing the metal of the rivet end to flow and be formed into a headed enlargement.

The aforementioned patents describe in detail the generation of high velocity shock wave forces through the discharge of electrical energy in a body of water and the transfer of such forces to the forming of metal parts such as flat blanks, tubes, cones and the like. The aforesaid patents also discuss the problems of efficient transformation of electrical energy into shock wave energy and holding of standoff power at high energy and potential levels, which is not only dangerous but severely strains the dielectric properties of the electrical discharge system. U.S. Pat. No. 3,452,565 (hereinafter referred to as applicant's patent) recites improvements whereby the disadvantages of prior art arrangements are largely obviated while retaining all of the advantages thereof. Such improvements include provisions for the safe charge and discharge of stored energy in a capacitor bank in a normal firing cycle of the apparatus for the application of the energy in the forming of metal parts, and for avoiding the completion of a cycle without causing a transfer of energy in the event of malfunctioning of the apparatus or when the operator, for whatever reason, desires to avoid firing and to return the apparatus to its initial unoperated condition. The charging of the capacitor bank to a voltage level of upwards of 18,500 volts at 60,000 joules of energy points up the need for safety precautions to protect the operator of the apparatus.

SUMMARY OF THE INVENTION

Automatic riveting machines presently in use in the aerospace industry for the assembly of parts are able to upset aluminum and steel rivets fairly easily but are not capable of upsetting titanium alloy rivets in a single operation. Furthermore, repeated impact or hammering of the titanium alloy rivets causes them to fracture and induces cracks in the parts being riveted together. The present invention therefore contemplates and is concerned with a riveting device and method which is capable of driving high strength rivets, such as titanium alloy rivets, in a single firing without hammering such rivets. The present invention is also concerned with an electric discharge device which embodies the theory and principles of the electrical discharge apparatus of applicant's patent and is capable of generating high velocity shock waves and applying the forces thereof to a rivet in a manner to cause the upsettable rivet end to flow and form a head.

More specifically, provision is made for a device having a movable piston which moves a cavitated anvil engaged with a rivet for upsetting the same upon application of the shock wave energy. To this end, the piston is mounted for sliding in a hollow housing having a cavity for receiving electrically conductive water, the piston serving as a mOvable closure at one end of the cavity. A transducer is mounted on the housing at the other end of the cavity and has spaced electrodes defining a gap across which high voltage electrical energy is discharged to generate high velocity shock waves in the water. The piston faces the transducer and moves axially in substantially the same direction as the shock waves in response to the application of shOck wave forces transferred to the piston through the water. Preferably, the piston has an arcuate wall suitably configured for substantially smooth transfer of shock wave energy thereto.

The present invention also makes provision for making an electrical discharge riveting device which can be held and easily handled by a worker for upsetting rivets against an anvil or bucking bar held by an assistant, electrical power for the device being delivered thereto through suitable lines connected to a portable power plant receiving power from a conventional 110-volt source. This renders the device readily portable for use at any desired point of work, rather than having to bring the work to a fixed location for riveting, but also requires that the device be proportioned in size and weight for easy handling by the worker and increases the problems of safeguarding the worker's welfare. The problems attendant upon the holding of standoff power at high energy and potential levels have been pointed out. In the case of a massive machine supported on a suitable base, the addition of weight to provide adequate strength and dielectric properties presents no great problem. However, such addition of weight is not acceptable for a hand-held device since it would detract from the easy handling thereof by a single worker and add to his fatigue or require the help of an additional man in handlinG the device itself. This would also reduce the ready portability of the device. The present invention therefore provides for making a device which is relatively light, with the parts thereof proportioned in size, weight and mass for balancing the dynamic forces involved in upsetting a rivet for minimizing worker fatigue. The present invention also provides for coupling the transducer to electrical power by means having high dielectric and strength properties, for insuring the safety of the worker. Additionally the mount for the device is made of material having high dielectric and shock absorbing properties and has handles. A trigger control is conveniently located on the mount adjacent one of the handles.

The present invention has the advantage of providing the required power and suitable controls for easily applying sufficient force to a high strength rivet without hammering the rivet, for upsetting the free end thereof in a safe manner to cause the metal to flow and form into a snug-fitting head, all in one operation of the device. The upsetting of the rivet in this manner avoids hammering the rivet and parts being joined, and causes a slight increase in the rivet diameter so that there is an interference fit of the upset rivet in the rivet holes, which makes for a sound, crack-free high strength rivet joint, not possible using prior art devices.

BRIEF DESCRIPTION OF THE DRAWINGS

FIG. 4 is a larger scale fragmentary sectional view of a portion of the hand-held device, showing a trigger-operated switch.

FIG. 5 is a perspective view of the hand-held riveting device, shown in use and connected to a portable power plant.

FIG. 6 is a schematic diagram illustrating a portion of the electrical circuitry of the power plant.

FIG. 7 is a larger scale longitudinal sectional view of a coupling mechanism for attaching a high voltage coaxial power cable to the device.

FIG. 8 is a fragmentary sectional view of the portion of the coaxial cable.

DESCRIPTION OF EMBODIMENTS

Figure 1:
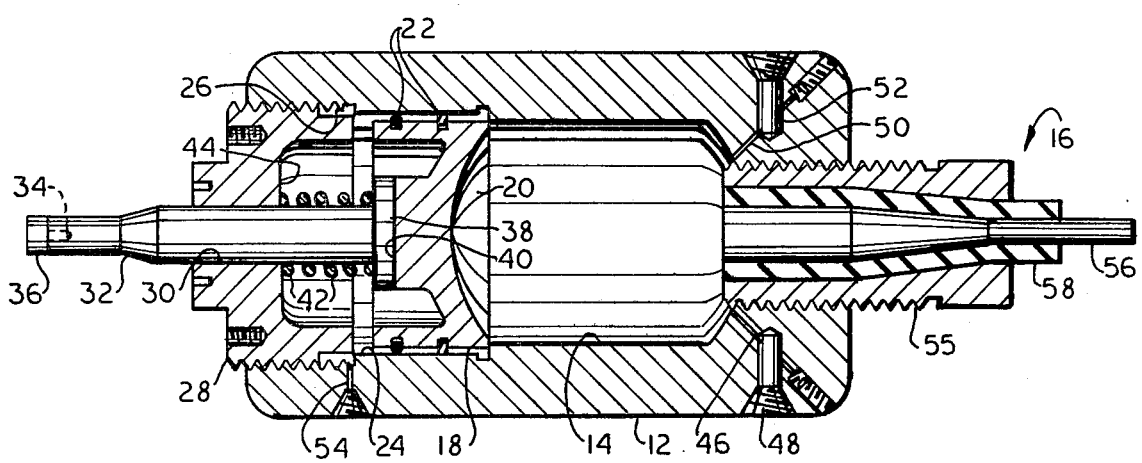
FIG. 1 is a longitudinal sectional view showing the essential parts of a basic form of riveting device embodying the principles of the present invention.

Referring to the drawings, there is shown in FIG. 1, in longitudinal section, a riveting device 11 embodying the principles of the present invention and including a hollow body or housing 12 formed with an internal cavity or chamber 14. Secured in the housing and closing off one end of the cavity is a transducer 16, the opposite end of the cavity being closed off by a piston 18 having an arcuate surface 20 in facing relation to the transducer. The piston is mounted for sliding movement coaxially of the housing and is provided with piston rings 22 which engage the walls of a smooth bore 24 formed in the housing. Extending inwardly from one end of the housing is a threaded bore 26 disposed coaxially of the bore 24 and in communication therewith. Received in the bore 26 is a threaded gland 28 having a central axial perforation 30. Snugly fitted for sliding movement in the perforation 30 is a rod or plunder 32 having ends extending therebeyond, the exterior end of the rod being provided with a bore 34 for the attachment of a riveting adaptor or anvil 36. The inner end of the rod is provided with an enlargement or flat head 38 which is urged against a flat wall 40 on the piston 18 by the action of a coil spring 42 reacting between the head and an inner surface 44 of the gland 28.

The chamber cavity 14 is adapted to receive a body of electrically conductive water, such as common tap water, which water is preferably admitted by way of bores 46 and 48 formed in the housing 12. The hOusing is also provided with exit bores 50 and 52 for the passage of air and water to insure that the cavity is filled with water free of any bubbles of air or other gas. Any water seeping past the piston rings 22 can be drained off through a bleed bore 54 formed in the housing. Suitable conduits or hoses, not shown, can be connected to the bores 48, 52 and 54.

The transducer 16 consists of an annular electrode 55, in the form of a threaded gland, and a central electrode 56, with a suitable insulation 58 therebetween, the gland being screwed into the housing 12 at one end thereof. Thus, when high voltage high energy electrical power is delivered by the electrode 56 and is discharged to the electrode 55 across the gap therebetween defined by the insulation 58, high velocity shock waves are generated in the body of water and the energy of the shock wave forces is transferred through the water to the piston 18, the surface 20 of which is suitably configured for a substantially smooth transfer of the shock wave forces thereto. This causes the piston to travel away from the transducer and move the rod 32 against the action of the spring 42 for causing the anvil 36 to upset a rivet engaged thereby. Because of the considerable amounts of energy involved and the mechanical forces resulting from the application thereof, the several parts of the device 11 are sufficiently rugged in construction and the transducer is preferably provided with tapered surfaces for maintaining the central electrode in place.

Figure 2:
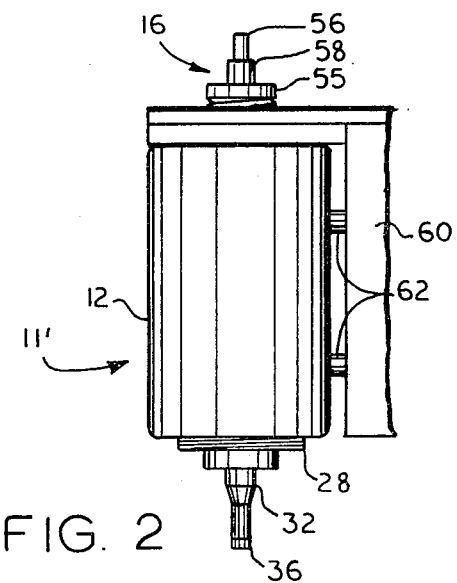
FIG. 2 is a smaller scale side elevational view of one form of the invention, mounted to dispose the longitudinal driving axis thereof vertically.

The unitary device 11 of FIG. 1 is basic and can be mounted as desired to suit the purpose at hand. For example, as shown in FIG. 2, such device can be mounted on a support 60, fragmentarily shown, to provide a riveting device 11' having the longitudinal driving axis thereof disposed vertically for upsetting vertically aligned rivets placed thereunder. It is understood, of course, that a suitable lower anvil or bucking bar, not shown, is provided for the riveting operation. The device 11' preferably includes shock absorbing connectors 62 and the support 60 has sufficient rigidity and stability. The support 60 can be fixed or stationary, in which case the rivets to be upset are passed in order under the device and placed in engagement with the anvil thereof. Alternatively, the support can be mounted for movement along a line of travel over a row of rivets and stoPped at intervals for alignment with the rivets for upsetting each in turn, after engagement therewith. Power can be coupled to the device 11' in any suitable manner, preferably after the manner taught and disclosed in applicant's patent because of the many safeguards and safety features included therein for the well-being of the operator of the riveting device.

Figure 3:
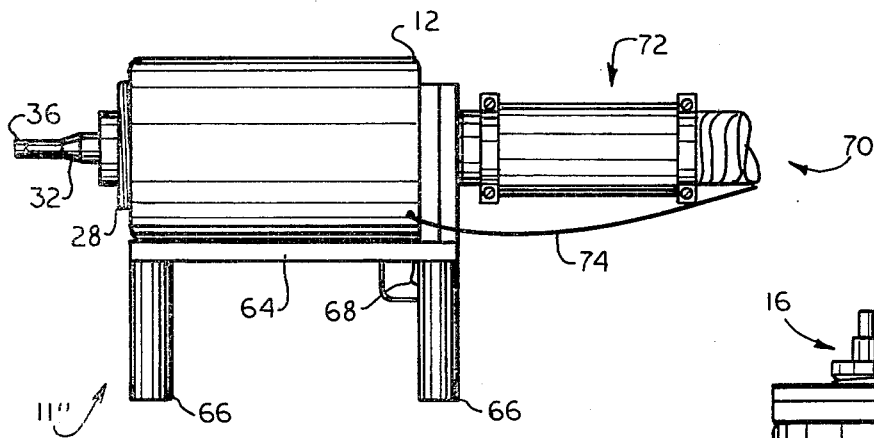
FIG. 3 is a smaller scale side elevational view of a hand-held form of the riveting device.

Obviously, the basic device or unit 11 of FIG. 1 can be mounted for action along lines other than the vertical. For example, the unit can be mounted as shown in FIG. 3 on a lightweight mount 64 having handles 66 to provide a hand-held riveting device 11''. The mount and handles are preferably made of suitable material having high dielectric and shock absorbing properties. Adjacent one of the handles is a trigger 68 conveniently located for manipulation by the hand of the operator gripping the handle. Electrical power is delivered by a coaxial cable 70, fragmentarily shown, and a coupling mechanism 72, both of which are later described in greater detail. Suitable hoses 74 serve to supply and drain water.

As shown in FIG. 4, the trigger 68 is mounted for pivoting on a pin 76 and is pressed by a spring 78 to a normal unoperated position. Operatively associated with the pivoting trigger is a switch 80 having normally open contacts 82 which are connected to wires or leads 84 and 86.

FIG. 5 illustrates the hand-held riveting device 11'' being used by a worker or operator O for upsetting a rivet R to join together work parts W with the help of a helper or assistant A holding an anvil or bucking bar 88. To assist the operator in aligning the device with the rivet, a positioner 90, later described in greater detail, is secured to the forward of the device. The wires 84 and 86, the cable 70 and the hoses 74 are suitably secured to form a harness 92 which is connected to a portable power plant 94 adapted to be connected to sources of electrical power and water by lines 96 and 98, respectively.

Power plant 94 can be of any suitable form for delivering electrical energy to the hand-held riveting device 11''. However, it is preferred to adapt the electrical power delivery means described in detail in applicant's U.S. Pat. No. 3,452,565, more particularly the description in relation to FIG. 13 thereof, for the purpose at hand. Accordingly, as schematically shown in FIG. 6, a charged capacitor bank 113, represented by a single capacitor, is adapted to discharge energy via a line 114 upon the closing of normally open contacts 115 in response to operation of a firing switch S1. The switch S1 is adapted to operate upon the energization of a relay coil 247 which closes a pair of normally open switches 248 for energizing a relay coil 249 operatively connected to the firing switch. A rectifier 250 connected across the coil 249 insures that any backsurge of energy due to the magnetic field associated with the discharge of energy through the switch contacts 115 is shortcircuited.

The charging of the capacitor bank 113 and operation of the firing switch S1 is controlled by the trigger-operated switch 80 on the riveting device 11''. To this end, power line 96 includes a pair of power leads 300 and 301, the latter having a gap 166 therein. The wires 84 and 86 extend from the trigger-operated switch 80 and are connected to the power lead 301 so as to bridge the gap 166 upon the closure of switch contacts 82. This results in the starting of a motor 302 in response to the flow of power through a relay coil 305 of a relay R22 which operates to close normally open contacts 307 for the delivery of power to the motor via lead 308. Associated with the motor 302 are various cam-operated switch meanS, described in detail in the applicant's aforementioned U.S. Pat. No. 3,452,565, which perform a sequence of operations initiated by starting of the motor for charging the capacitor bank 113 and its eVentual discharge by operation of the firing switch S1 through energization of the relay coil 247.

As previously mentioned, the electrical discharge method involves the development and application of tremendous amounts of energy, posing problems for the safety and well-being of the workers. These problems are greatly increased in the case of a hand-held electrical discharge device. Not only must the device be of rugged construction for safely withstanding the application of forces but must also be proportioned in size, weight and mass for relatively easy handling in the hands of a worker. This can be accomplished by the selection of suitable materials having requisite strength and high dielectric and shock absorbing properties for insuring the safety of the worker and for dynamic balancing of the forces involved in the upsetting of a rivet to reduce the weight and shock forces which are imparted to the worker to minimize fatigue of the work involved.

Further in the interests of the safety of the workers, power is delivered to the device through a coaxial cable 70 and a coupling 72. As shown in FIGS. 7 and 8, the coaxial cable includes a central multistrand electrical cable 400. One end of the electrical cable is secured to the mobile power plant 94 and is connected to one of the switch contacts 115 contained therein, as schematically shown in FIG. 6. The other end of the electrical cable is fitted to a metallic tip 402, shown in FIG. 7, and is surrounded by suitable insulation having high dielectric properties, such as a sleeve 404, of Neoprene or the like, and several layers of 20 KV tape 406 around which is wrapped a layer of 6 KV tape 408, better seen in FIG. 8. Surrounding the insulated cable is a braided metal sleeve 410, one end of which is secured to the power plant 94 and connected to ground therein as shown in FIG. 6. The other end of the metal sleeve is snugly fitted within a metal collar 412 having an annular flange 414. Several layers of high KV tape 416, terminating at the flange 414, surround the metal sleeve, all of which is encased in a layer of 6 KV tape 418 and polyvinyl shrink tubing 420, the tubing and the tape 418 lapping over the flange 414.

Figure 9:
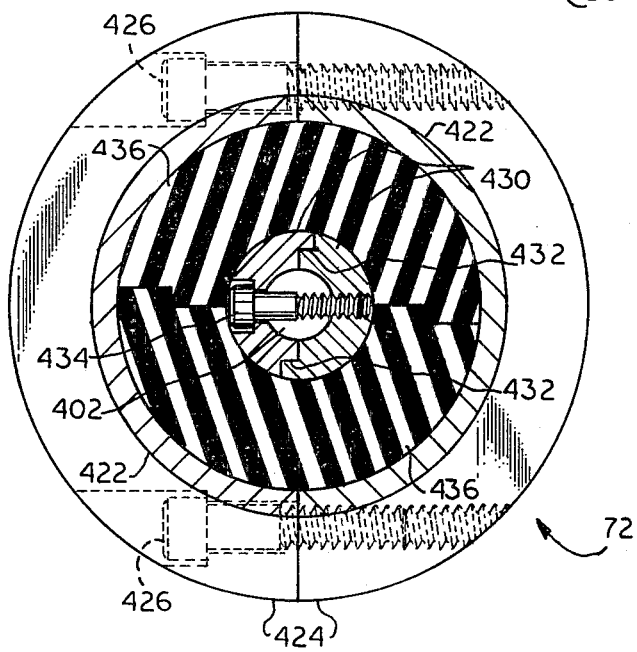
FIG. 9 is a cross-sectional view on line 9—9 of FIG. 7.

Referring to FIGS. 7 and 9, the coupling mechanism 72 includes a pair of semicylindrical members or half-sleeves 422 and joined to the ends thereof are half-collars 424, all of metal. The half-collars are adapted to be placed in facing relation for holding the half-sleeves together to define a cylindrical cavity therewithin and are suitably apertured for the reception of bolts 426.

The collar 412 is adapted to be received between a pair of the half-collars 424, the metallic gland electrode 55 being similarly fitted to the other pair of facing half-collars, as will be appreciated from a viewing of FIG. 7. The electrode 55 is thus effectively connected to ground through the metallic coupling 72 and braided metal sleeve 410.

The electrode 56 is electrically connected to the metallic tip 402 by means of a pair of metallic clamping half-sleeves 430 having stepped mating edges 432 drawn together by a bolt 434 for clamping the ends of the electrode 56 and metal tip 402 therebetween with sufficient overlap to insure safe transfer of electrical power from the tip to the electrode. The clamping half-sleeves and bolt are of sufficiently rugged construction to resist the action of any separating forces in the transfer of the electrical power. Further safety is assured by the provision of stepped edge mating half-sleeves 436 of high dielectric insulating material which is disposed about the half-sleeves 430 and confined thereagainst by the half-sleeves 422, the edges of the half-sleeves 436 being a quarter-turn around from the edges of the half-sleeves 422 and 430, respectively. The coupling 72 is made as light as possible consistent with sufficient ruggedness to perform its purpose of not only effectively grounding the electrode 55 but also effectively delivering electrical power to the electrode 56 in a manner which inures to the safety of the worker. If desired, power can similarly be coupled to the riveting devices 11 and 11'.

Figure 10:
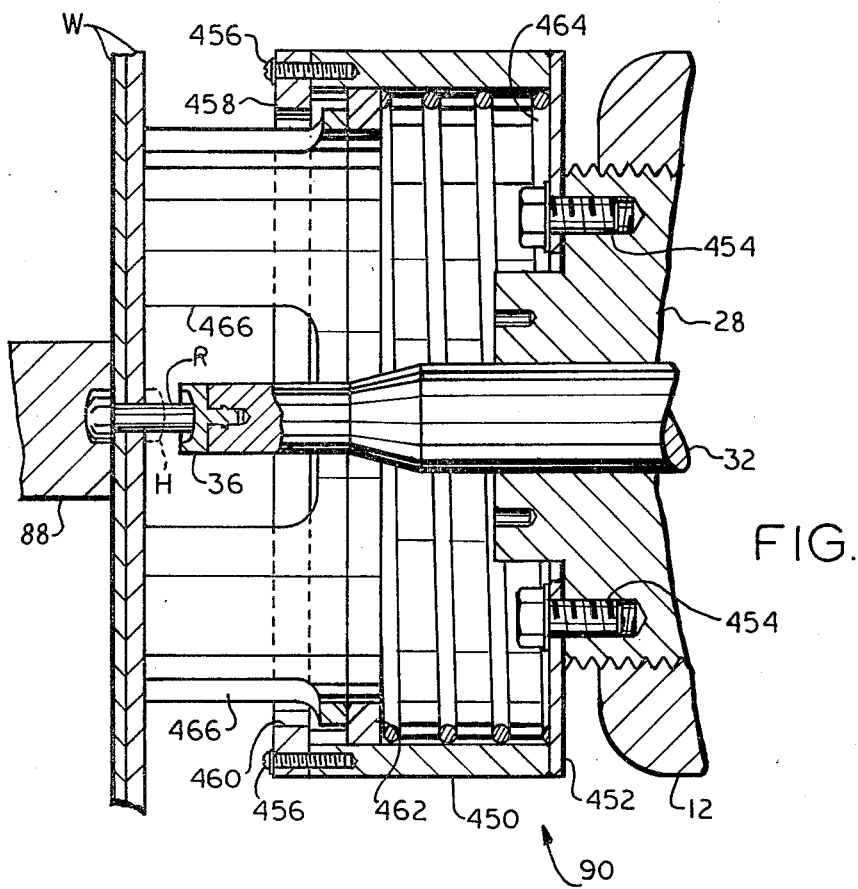
FIG. 10 is a larger scale fragmentary sectional view of the device, showing a spring-pressed positioner attached thereto for assisting in properly aligning the device relative to a rivet.

Since the shock wave forces resulting from the discharge of electrical energy are applied axially of the device through movable rod 32 thereof, it is important that the rod be axially aligned with the rivet. The positioning mechanism 90 serves to assist the worker in properly aligning the device relative to the rivet R, as shown in FIG. 10, and includes a cylindrical member 450. One end of the member is secured to an attaching plate 452 which is fitted to the outer end of the threaded gland 28 and is secured thereto by bolts 454. Secured to the other end of the member, by screws 456, is an annular member 458 having an opening 460 defined by an inner circular edge inwardly of the cylinder 450. Mounted for sliding movement within the cylinder is a ring 462 pressed by a spring 464 which urges the ring toward the annulus 458. The spring is disposed between plate 452 and the ring, and the annulus serves as a stop to limit movement of the ring. Secured to the ring are spaced fingers 466 which project through the opening 460 and terminate in a plane which is perpendicular to the axis of the rod 32. Accordingly, the worker can look between the fingers 466 for bringing the cavitated anvil 36 on the end of the rod into line with the end of the rivet which extends through the work parts W and is backed by the anvil or bucking bar 88. The worker can then manipulate the riveting device to assure that the ends of all the fingers are in engagement with the work parts, after which pressure can be applied to bring the anvil 36 into engagement with the rivet end, as shown in FIG. 10, thus assuring that the rivet and the rod are axially aligned for axial application of the shock forces resulting from the electrical discharge.

It is believed that the operation of the riveting devices of the present invention is readily apparent and is briefly summarized at this point. As shown in FIG. 1, the discharge of electrical power across the gap between the electrodes 55 and 56 generates high velocity shock waves in the body of water contained in the cavity 14, the forces of the shock wave being transferred through the water to the piston 18 which moves the rod 32 against the pressure of the spring 42. In the use of the hand-held device 11", the rod 32 is axially aligned and the cupped anvil 36 is engaged with the rivet R, as shown in FIG. 10, after which the trigger 68 is manipulated to operate switch 80 and apply shock wave forces causing the end of the rivet to flow and form a headed enlargement or rivet head H. In other forms of the invention, provision is made for proper alignment and the discharge of electrical power is initiated by similar or equivalent switching means.

There has thus been provided a safe and reliable riveting device and method for driving high strength rivets which employs shock wave forces resulting from the discharge of electrical energy in a body of water for flowing the metal of the rivet, which device can be hand-held and easily handled by a worker and has meanS for coupling electrical power thereto in a manner which assures the safety of the worker and makes for easy application thereof in different work areas, thereby obviating the necessity for bringing the work to the device. The device is also capable of being mounted for movement along a line or fixed for driving along a desired axis.

Although the present invention has herein been shown and described in considerable detail in what are believed to be the most practical and preferred embodiments thereof, it is to be understood that many variations thereof are possible and that the present invention is not to be limited to such details but is to be considered in its broadest aspects and accorded the full scope of the appended claims so as to embrace any and all equivalent devices and methods.

Having described the invention, what is claimed as neW and useful and desired to be secured by U.S. Letters Patent is:

1. A hand held riveting mechanism comprising:
    a housing of a size and weight to be conveniently hand held during a rivet heading operation and having a cavity therein
    a body of electrically conductive water in such cavity;
    a transducer mounted on the housing having a pair of spaced electrodes defining an electrical discharge gap within the body of water
    electrical means connected to the transducer and operable to discharge electrical energy across the discharge gap for generating shock wave forces within the body of water
    a piston mounted in the cavity and movable in response to such shock wave forces,
    a shock wave transmitting member mounted with one end thereof seated to the piston and an opposite end thereof directed exteriorly of the housing for engaging a rivet and applying such shock wave forces to such rivet, and
    means releasably retaining the shock wave transmitting member so seated to the piston.

2. The device of claim 1 in which the cavity has a cylindrical portion, the transducer is disposed on the axis of the cylindrical cavity portion, and the piston and shOck wave transmitting member are aligned with said axis and movable therealong.

3. The device of claim 2 wherein the shock wave transmitting member is a rod and further including means on the housing having positioning means adjacent the rivet engaging end of the rod for assisting in axially aligning the rod with a rivet.

4. The device of claim 3 in which the positioning means includes spaced members having ends terminating in a plane disposed perpendicular to the rod axis, said members being adjustable relative to the housing in the direction of such axis so that the rod end can engage a rivet extending through flat work and the members can simultaneously engage said flat work.

5. The device of claim 1 in which the electrical means includes an insulated cable having an end aligned with one electrode of the transducer, and said one electrode is tapered outwardly, electro-conductive means connecting said cable end and said electrode, insulating means in the form of a tapered sleeve fitted in conforming, sealed relation about said one electrode and into a correspondingly tapered opening in a threaded plug screwed in sealed relation into a threaded hole in the housing and opening into such cavity.

6. The device of claim 1 in which the housing and parts mounted thereon are proportioned in size, weight and mass for easy handling by a single worker and for substantial balancing of dynamic forces involved in the upsetting of a rivet; whereby the device is readily portable and worker fatigue is minimized.

7. A hand held, shock wave riveting mechanism comprising a housing of a size and weight to be conveniently hand held during a rivet heading operation, a shock wave generating cylinder embodied in the housing, said cylinder being closed at one end thereof, a piston sealed for axial movement in the cylinder, a body of shock wave liquid in the cylinder between the piston and the closed end of the cylinder, electrical discharge means mounted to discharge an electric spark through the body of liquid to generate shock wave forces in the body of liquid driving the piston axially away from the closed end of the cylinder, a force transmitting rivet engaging member seated on the piston and extending therefrom in the direction of piston movement when so driven, an extension on the housing in the direction of piston movement when so driven, and spring means operatively mounted between the force transmitting member and said extension and biasing the force transmitting member and the piston toward the closed end of the cylinder.

8. A hand held riveting machine as defined in claim 7 wherein the housing extension is adjustable relative to the housing in the direction of piston movement.

9. A hand held riveting machine as claimed in 8 wherein an end of the housing has a threaded portion co-axially of the piston, and the housing extension is tubular and has a threaded portion in threaded relation with the threaded housing portion for axial adjustment of the extension.

* * * * *